US009537889B2

(12) United States Patent
Kuehnel et al.

(10) Patent No.: US 9,537,889 B2
(45) Date of Patent: Jan. 3, 2017

(54) TRUSTING CROWDSOURCED DATA WITH ISSUED TAGS

(75) Inventors: Thomas Werner Kuehnel, Seattle, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1281 days.

(21) Appl. No.: 13/311,513

(22) Filed: Dec. 5, 2011

(65) Prior Publication Data

US 2013/0144879 A1 Jun. 6, 2013

(51) Int. Cl.
*G06F 17/30* (2006.01)
*H04L 29/06* (2006.01)
*H04L 12/801* (2013.01)

(52) U.S. Cl.
CPC ..... *H04L 63/1458* (2013.01); *G06F 17/30286* (2013.01); *H04L 47/34* (2013.01); *G06F 17/30345* (2013.01); *G06F 17/30356* (2013.01); *H04L 47/14* (2013.01)

(58) Field of Classification Search
CPC .............. G06F 17/30286; G06F 17/30345; G06F 17/30171; G06F 17/30356
USPC ........................................................ 707/736
See application file for complete search history.

(56) References Cited

U.S. PATENT DOCUMENTS 6,138,147 A * 10/2000 Weaver et al. ............... 709/206
8,423,574 B2 * 4/2013 Carter ............... G06F 17/30265
707/791
2004/0235493 A1 * 11/2004 Ekerborn .................... 455/456.1
2006/0174130 A1 * 8/2006 Noble ............................ 713/182
2008/0001752 A1 * 1/2008 Bruns .................... G06Q 10/08
340/572.1
2008/0140786 A1 * 6/2008 Tran ...................... G06Q 10/10
709/206
2009/0177704 A1 * 7/2009 Consul ................. G06Q 10/107
2009/0276790 A1 * 11/2009 Greenlee .......... G06K 19/07345
719/318

(Continued)

OTHER PUBLICATIONS

Karger, et al., "Iterative Learning for Reliable Crowdsourcing Systems", Retrieved at <<http://web.mit.edu/swoh/www/paper_crowdsourcing_nips.pdf>>, Retrieved Date: Oct. 12, 2011, pp. 1-9.

(Continued)

*Primary Examiner* — Tuan A Pham
*Assistant Examiner* — Merilyn Nguyen
(74) *Attorney, Agent, or Firm* — John Jardine; Dan Choi; Micky Minhas

(57) ABSTRACT

Embodiments control submission of crowdsourced data from a computing device to a cloud service. The cloud service receives a packet from the computing device having collected data and a single-use data tag associated therewith. The single-use data tag represents one of a threshold quantity of single-use data tags issued to the computing device. The cloud service validates the single-use data tag in the received packet by, for example, searching for the single-use data tag in a tag store maintained by the cloud service. The collected data from the received packet is stored by the cloud service based on the validation. After validation, the tag store is updated to prevent re-use of the single-use data tag. In some embodiments, the cloud service is a location service receiving crowdsourced beacon fingerprint data from a plurality of mobile computing devices.

20 Claims, 7 Drawing Sheets

(56) References Cited

U.S. PATENT DOCUMENTS

| | | | |
|---|---|---|---|
| 2010/0019887 A1* | 1/2010 | Bridgelall et al. | 340/10.2 |
| 2010/0138500 A1* | 6/2010 | Consul | G06Q 10/107 |
| | | | 709/206 |
| 2010/0229082 A1* | 9/2010 | Karmarkar et al. | 715/205 |
| 2011/0153052 A1 | 6/2011 | Pettibone et al. | |
| 2011/0153517 A1 | 6/2011 | Thomas et al. | |
| 2011/0161076 A1 | 6/2011 | Davis et al. | |
| 2011/0289582 A1* | 11/2011 | Kejriwal | G06F 21/566 |
| | | | 726/22 |
| 2012/0030232 A1* | 2/2012 | John | G06Q 10/00 |
| | | | 707/769 |
| 2013/0176115 A1* | 7/2013 | Puleston et al. | 340/10.51 |

OTHER PUBLICATIONS

Blanco, et al., "Repeatable and Reliable Search System", Retrieved at <<http://59.108.48.12/proceedings/SIGIR/SIGIR_2011/docs/p923.pdf>>, Proceedings of the 34th international ACM SIGIR conference on Research and development in Information, Jul. 2011, pp. 923-932.

Mashhadi, et al., "Quality Control for Real-time Ubiquitous Crowdsourcing", Retrieved at <<http://www.cs.ucl.ac.uk/staff/l.capra/publications/ubicrowd11.pdf>>, Proceedings of the 2nd international workshop on Ubiquitous crowdsouring, Retrieved Date: Oct. 12, 2011, pp. 4.

"Faspex Security Model", Retrieved at <<http://www.asperasoft.com/en/support/how_tos_8/Faspex_Security_Model_32>>, Retrieved Date: Oct. 12, 2011, pp. 3.

* cited by examiner

TRUSTING CROWDSOURCED DATA WITH ISSUED TAGS

BACKGROUND

Some existing data services rely on data collected by a plurality of computing devices to adjust output. The data services process such "crowdsourced" data to produce output for distribution to and consumption by various devices. For example, some existing location services rely on crowdsourced beacon fingerprint data to determine a location of a requesting device. The beacon fingerprint data includes a set of beacons observed at a particular location.

To help ensure the integrity of the crowdsourced data, some existing data services provide authentication to confirm the identity of the computing device submitting the data and encryption to prevent tampering with the submitted data. Authentication and encryption, however, cannot validate or vet the data contained within the submission to prevent the introduction of erroneous or malicious data into the data maintained by the data services. For example, a malicious device may associate the same set of observed beacons with multiple different locations. Crowdsourced data from this malicious device will pass authentication and encryption tests at the location service, yet will contaminate the data maintained by the location service reducing the location determination accuracy of the location service.

SUMMARY

Embodiments of the disclosure enable the submission of a limited amount of trusted crowdsourced data from a computing device to a cloud service. The cloud service receives, from the computing device, a packet having collected data and a single-use data tag associated therewith. The single-use data tag is one of a threshold quantity of single-use data tags issued to the computing device. The single-use data tag in the received packet is validated by searching for the single-use data tag in a tag store maintained by the cloud service. The collected data is stored based on the validation. The tag store is updated to prevent re-use of the single-use data tag.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
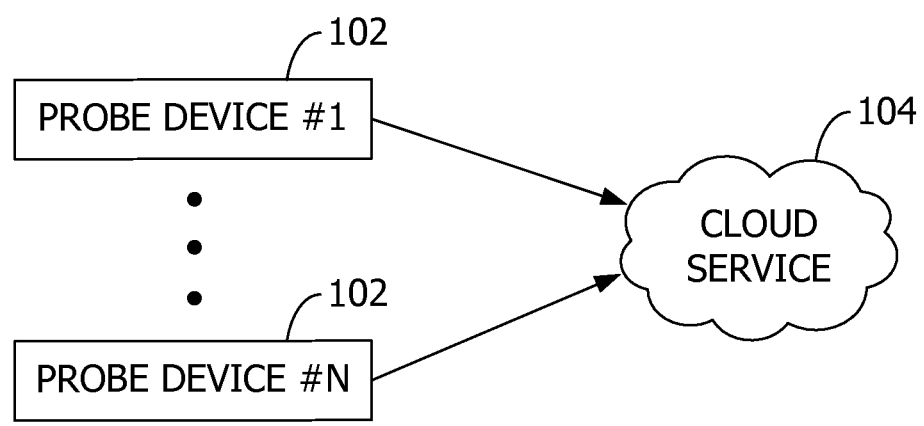
FIG. 1 is an exemplary block diagram illustrating a plurality of probe devices that collect data for transmission to a cloud service.

Referring to the figures, embodiments of the disclosure enable one device to trust data submitted from another device with a data tag 206. In some embodiments, a cloud service 104 receives tagged crowdsourced data from a plurality of computing devices. Aspects of the disclosure assure that the cloud service 104 cannot be compromised by a malicious user 302, while maintaining the anonymous character of the crowdsourced data. In operation, a tag authority associated with, or trusted by, the cloud service 104 issues a threshold quantity or other limited quantity of single-use data tags 206 to the computing devices. The computing devices include at least one of the data tags 206 with each crowdsourced submission (e.g., packet 316) sent to the cloud service 104. The cloud service 104 "trusts" the crowdsourced packet 316 at least because of the included data tag 206 and incorporates the crowdsourced packet 316 into the data maintained by the cloud service 104. Crowdsourced packets 316 without valid data tags 206 are discarded.

Aspects of the disclosure reduce the incorporation of malicious data into the cloud service 104 at least because of the limited quantity of data tags 206 issued to any one of the computing devices. By only accepting or trusting crowdsourced data associated with one of the issued data tags 206, the cloud service 104 throttles the amount of crowdsourced packets 316 sent by any one of the computing devices thereby assuring minimal harm to the consistency of the data maintained by the cloud service 104. For example, a malicious computing device cannot increase the volume of crowdsourced packets 316 accepted by the cloud service 104 because the malicious computing device will run out of issued data tags 206.

Further, while some existing data services are limited in their ability to identify and track crowdsourced packets 316 due to privacy concerns, the data tags 206 in the disclosure enable identification and tracking of the crowdsourced packets 316 while maintaining anonymity of the submitting computing devices.

Referring next to FIG. 1, an exemplary block diagram illustrates a plurality of probe devices 102 that collect data for transmission to the cloud service 104. Each of the plurality of probe devices 102, such as probe device #1 through probe device #N, may be implemented as a hardware device, as software executed by a computing device, or any combination thereof. Any node such as a computing device may support one probe device 102, or a plurality of the probe devices 102 (e.g., as virtual probes).

The probe devices 102 collect, or have access to, data from a data source. In some embodiments, the probe devices 102 correspond to, or are executed on, mobile computing devices 304 such as mobile telephones that collect beacon fingerprint data. Exemplary beacon fingerprint data includes a set of beacons observed by one of the mobile computing devices 304 at a particular location and time.

The probe devices 102 send the collected data such as the beacon fingerprint data to the cloud service 104. In some embodiments, the probe devices 102 use a secure transport such as transport layer security (TLS). The data received by the cloud service 104 from the probe devices 102 represents crowdsourced data. The cloud service 104 represents any entity that relies at least in part on data provided by the probe devices 102. The cloud service 104 may include, for example, any computing device including a server, a group of computing devices, and/or a peer device.

The probe devices 102 may send the collected data to the cloud service 104 at any time. For example, the probe devices 102 may send the collected data as the data is collected, after a defined amount of data is collected, or periodically (e.g., in a batch such as nightly).

As next described, the probe devices 102 combine the collected data with at least one of the single-use data tags 206 prior to submission to the cloud service 104.

Figure 2:
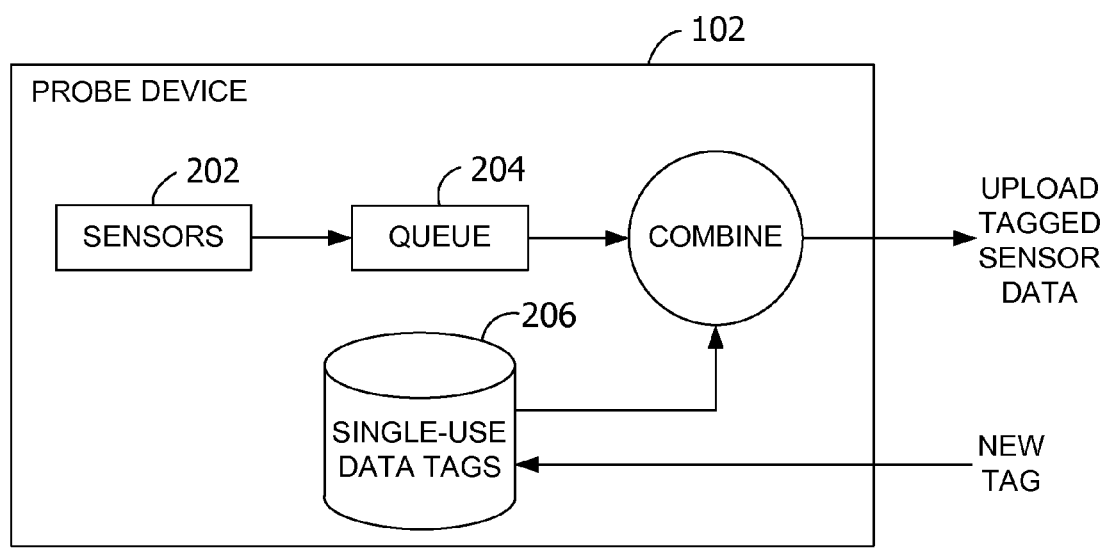
FIG. 2 is an exemplary block diagram illustrating the probe device combining collected sensor data with single-use data tags for transmission to the cloud service.

Referring next to FIG. 2, an exemplary block diagram illustrates the probe device 102 combining collected sensor data 314 with single-use data tags 206 for transmission to the cloud service 104. While the probe device 102 is described as collecting sensor data 314 in the example of FIG. 2, aspects of the disclosure are applicable to the probe device 102 collecting data other than, or in addition to, sensor data 314.

In FIG. 2, the exemplary probe device 102 has one or more sensors 202 therein for receiving data from the environment or from a user 302. In other embodiments (not shown), one or more of the sensors 202 may be located external to the probe device 102. The probe device 102 is operable with any form of sensor 202 including, for example, a global positioning system (GPS) receiver or a Wi-Fi receiver. In some embodiments, the sensor 202 may represent any component enabling the probe device 102 to communicate with another device via a wired or wireless connection.

Data obtained by the sensors 202 is stored in at least one queue 204 as data items or elements. The queue 204 represents any memory or data storage area capable of storing data produced, generated, or collected by at least one of the sensors 202. In some embodiments, each sensor 202 has at least one queue 204 associated therewith (e.g., there may be a separate queue 204 corresponding to each of the sensors 202).

The probe device 102 combines one or more data elements or data items from the queue 204 with at least one single-use data tag 206. The data tags 206 are stored in memory accessible by the probe device 102. In the example of FIG. 2, the data tags 206 are stored in memory internal to the probe device 102. In other examples (not shown), the data tags 206 may be stored in memory external to the probe device 102, such as on a flash drive. In some embodiments, the data tags 206 include a set of cryptographically signed tokens such as globally unique identifiers (GUIDs) representing permission from the cloud service 104 to submit or report a limited amount of data to the cloud service 104. Similar to currency, the data tags 206 are anonymous.

The data tags 206 are "single-use" because each data tag 206 cannot be used for more than one submission to the cloud service 104. For example, as described herein, after submission of the tagged sensor data 314 to the cloud service 104, the probe device 102 discards, deletes, alters, voids, expires, or otherwise prevents the used data tag 206 from subsequent use. New data tags 206 may be received from the cloud service 104 or other entity such as from a tag store 504 or data tag authority (see FIG. 5). For example, the probe device 102 stops sending data to the cloud service 104 after exhausting the supply of assigned data tags 206. In this example, the probe device 102 resumes sending data to the cloud service 104 after receiving one or more new data tags 206. The cloud service 104 may send the new data tags 206 to the probe device 102 in exchange for exchange for each verified crowdsourced packet 316, or after a defined period of time elapses. In some embodiments, receiving a new data tag 206 may include receiving updated expiration data 312 for the data tag 206. In other embodiments, receiving a new data tag 206 may include receiving more than just the expiration data 312.

The probe device 102 combines the data items from the queue 204 with at least one of the data tags 206 in various ways. For example, the prove device may merge the data item with the data tag 206, append or prepend the data tag 206 to the data item, perform or apply a function to the data item using the data tag 206 as input (e.g., hash the data item), sign the data items using the key (e.g., cryptographic signature) of the data tag 206, or otherwise associate the data item with the data tag 206.

Each data item or group of data items combined with at least one of the data tags 206 represents the crowdsourced packet 316 or submission for transmission to the cloud service 104. Because of the addition of the data tag 206, the crowdsourced packet 316 may also be referred to as a trusted crowdsourced packet. In the example of FIG. 2, the crowdsourced packet 316 includes tagged sensor data 314. The tagged sensor data 314 is uploaded or otherwise made available to the cloud service 104. For example, the tagged sensor data 314 is sent from the probe device 102 to the cloud service 104 via a network such as the Internet.

Figure 3:
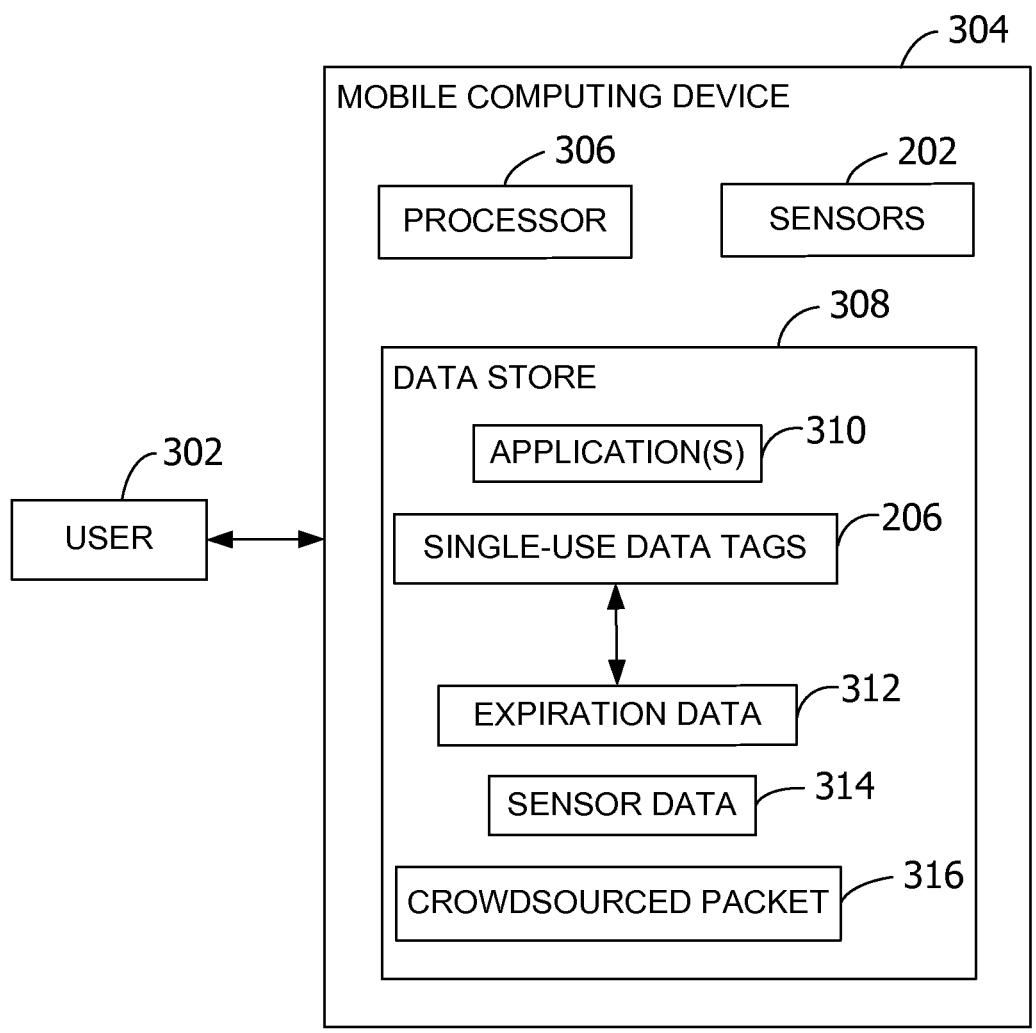
FIG. 3 is an exemplary block diagram illustrating a mobile computing device with sensors and a data store having the single-use data tags.

Referring next to FIG. 3, an exemplary block diagram illustrates the mobile computing device 304 with sensors 202 and a data store 308 having the single-use data tags 206. In the example of FIG. 3, the mobile computing device 304 represents or includes one or more of the probe devices 102 for collecting data. The mobile computing device 304 operates to submit a limited amount of trusted crowdsourced sensor data 314 to the cloud service 104. In the example of FIG. 3, the mobile computing device 304 is associated with at least one user 302. The mobile computing device 304 represents any device executing instructions (e.g., as application programs, operating system functionality, or both) to implement the operations and functionality associated with the mobile computing device 304 as described herein. The mobile computing device 304 represents any other portable device such as a mobile telephone, laptop, tablet, computing pad, netbook, gaming device, and/or portable media player. The mobile computing device 304 may also represent less portable devices such as desktop personal computers, kiosks, and tabletop devices. Additionally, the mobile computing device 304 may represent a group of processing units or other computing devices.

The mobile computing device 304 has at least one processor 306, one or more sensors 202, and the data store 308. The processor 306 includes any quantity of processing units, and is programmed to execute computer-executable instructions for implementing aspects of the disclosure. The instructions may be performed by the processor 306 or by multiple processors executing within the mobile computing device 304, or performed by a processor external to the mobile computing device 304. In some embodiments, the processor 306 is programmed to execute instructions such as those illustrated in the figures (e.g., see FIG. 4).

The sensors 202 include any component of the mobile computing device 304 capable of acquiring a signal and producing data values. The sensors 202 may be internal and/or external to the mobile computing device 304. Exemplary sensors 202 include, but are not limited to, a cellular radio or modem, a GPS receiver, a Wi-Fi adapter or modem, a BLUETOOTH brand communication service element, a three-dimensional motion sensor, a camera, a microphone, one or more accelerometers, and a photoreceptive light sensor. Each of the sensors 202 provides at least one sensor value for use by the mobile computing device 304 (e.g., by an operating system or applications 310). The type and range of the sensor values vary based on the sensor 202 and may include, for example, numerical values and/or alphabetic values.

The data store 308 may be internal to the mobile computing device 304 (as shown in FIG. 3), external to the mobile computing device 304 (not shown), or both (not shown). The data store 308 includes, among other data, one or more applications 310. The applications 310, when executed by the processor 306, operate to perform functionality on the mobile computing device 304. Exemplary applications 310 include mail application programs, web browsers, calendar application programs, address book application programs, messaging programs, media applications, location-based services, search programs, and the like. The applications 310 may communicate with counterpart applications or services such as web services accessible via a network. For example, the applications 310 may represent downloaded client-side applications that correspond to server-side services executed by the cloud service 104.

The data store 308 further stores one or more of the single-use data tags 206. In some embodiments, the data store 308 has no more than a threshold quantity of the data tags 206. The threshold quantity is determined by the cloud service 104, a web service, the tag store 504, a tag generator 508, a peer device, a data tag authority, or entity that issues the data tags 206 and is trusted by the cloud service 104. The mobile computing device 304 may also receive at least a portion of the threshold quantity of the data tags 206 from any of these entities (e.g., exchanging the data tags 206). As the mobile computing device 304 uses data tags 206, the cloud service 104 may provide additional data tags 206 for use by the mobile computing device 304, as described herein.

Each of the data tags 206 may have other data associated therewith. For example, each of the data tags 206 may have a key (e.g., cryptographic signature of the data tag 206), issuing entity, maximum data value, and expiration data 312. The maximum data value identifies how much data (e.g., samples or bytes) can be associated with the data tag 206 in one crowdsourced packet 316. The expiration data 312 identifies when the data tags 206 will no longer be accepted by the cloud service 104. For example, the expiration data 312 may identify a particular date, or may include data that the mobile computing device 304 and/or cloud service 104 can use to calculate when the data tag 206 will expire.

The data store 308 also stores the sensor data 314 collected from one or more of the sensors 202 and the crowdsourced packets 316 representing one or more items of the collected data combined with at least one of the data tags 206.

Exemplary operation of the mobile computing device 304 is described next with reference to FIG. 4.

Figure 4:
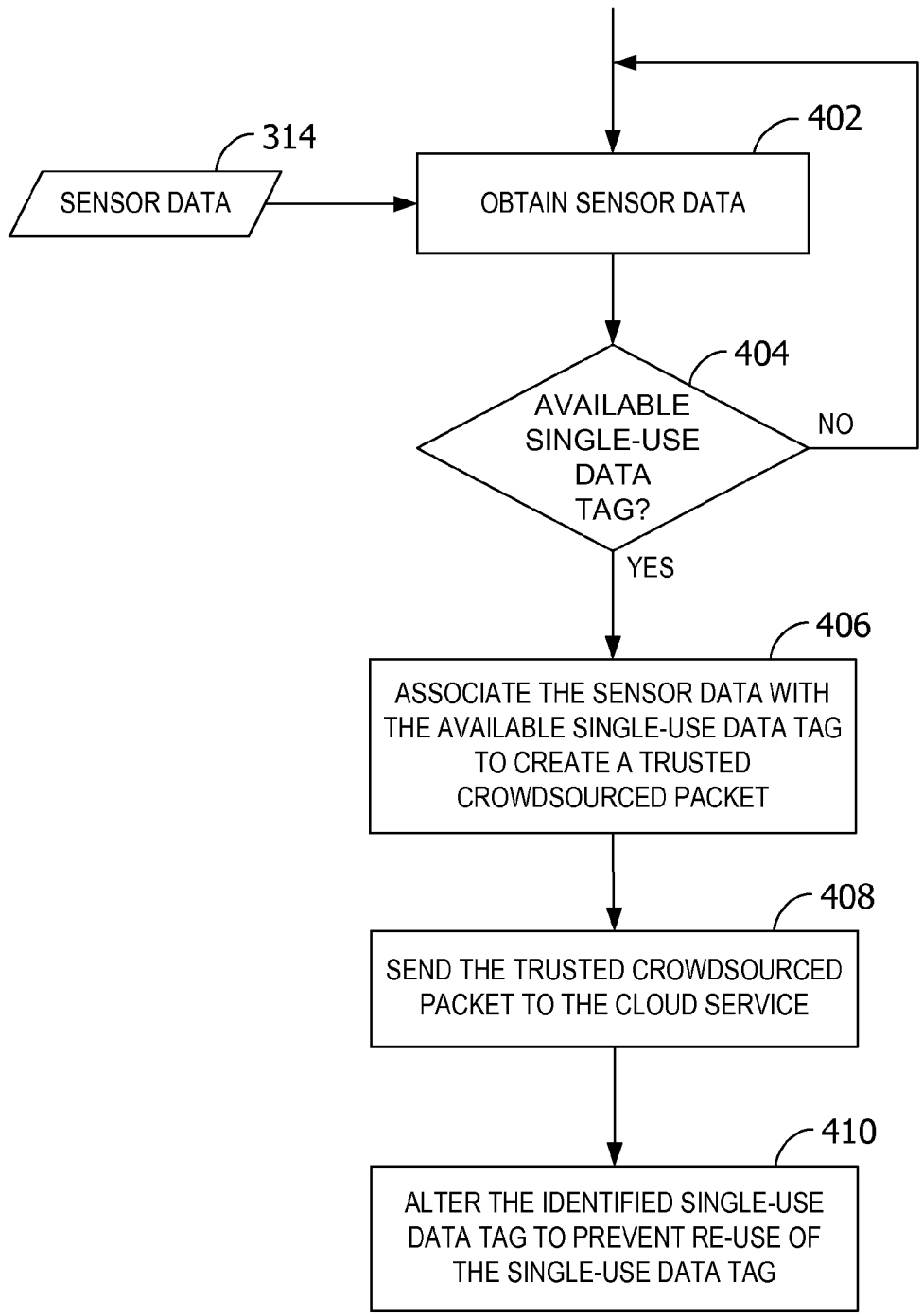
FIG. 4 is an exemplary flow chart illustrating operation of the mobile computing device to collect sensor data for transmission to the cloud service with one of the single-use data tags.

Referring next to FIG. 4, an exemplary flow chart illustrates operation of the mobile computing device 304 to collect sensor data 314 for transmission to the cloud service 104 with one of the single-use data tags 206. At 402, the mobile computing device 304 obtains sensor data 314 from at least one of the sensors 202. The mobile computing device 304 may receive the sensor data 314 as data items or values. The sensor data 314 includes any data available from the sensors 202 and may include beacon fingerprint data (e.g., one or more beacons observed by the mobile computing device 304) such as a positioned observation.

The mobile computing device 304 has one or more of the data tags 206. The data tags 206 represent a threshold quantity of single-use data tags 206 assigned or issued to the mobile computing device 304 by the cloud service 104 or other entity. At 404, the mobile computing device 304 determines whether one of the data tags 206 is available. For example, the mobile computing device 304 may search or check the memory area to identify a valid data tag 206. In some embodiments, the data tag 206 is determined to be valid based on the expiration data 312 associated with the data tag 206. If the expiration data 312 indicates that the data tag 206 has not expired, the mobile computing device 304 selects this data tag 206. If a plurality of data tags 206 remains valid, the mobile computing device 304 may select the data tag 206 closest to expiration (e.g., select an "older" data tag 206 rather than a "newer" or more recently received data tag 206).

At 406, the mobile computing device 304 associates the obtained sensor data 314 with the identified data tag 206 to create a trusted crowdsourced packet 316 or submission. At 408, the mobile computing device 304 sends the packet 316 to the cloud service 104 for storage. The mobile computing device 304 may send the packet 316 immediately after creation of the packet 316, or some time later (e.g., as part of an hourly or daily batch). At 410, the mobile computing device 304 alters the identified data tag 206 in the memory area to prevent re-use of the data tag 206. For example, the data tag 206 may be altered by removing the identified single-use data tag 206 from the memory area, and/or altering the expiration data 312 to indicate that the identified single-use data tag 206 has expired.

Figure 5:
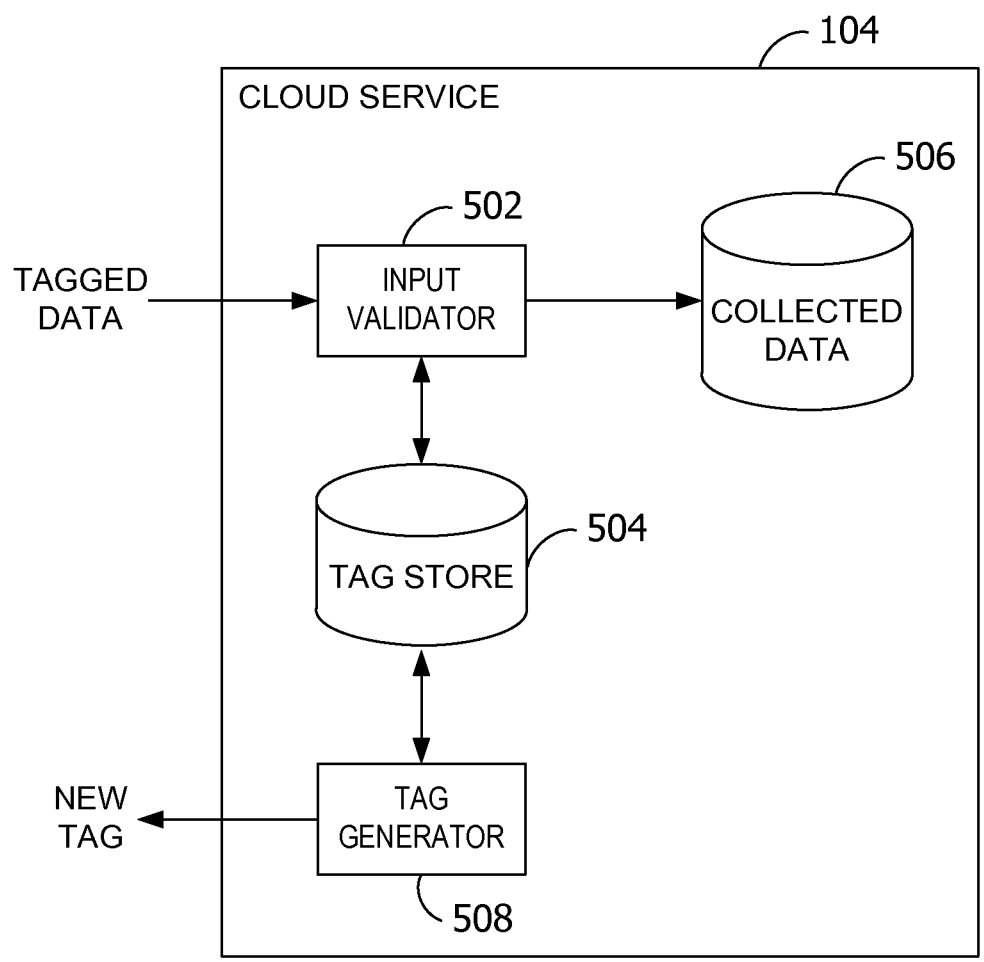
FIG. 5 is an exemplary block diagram illustrating the cloud service validating received data packets prior to storage of the collected data.

Referring next to FIG. 5, an exemplary block diagram illustrates the cloud service 104 validating received packets 316 prior to storage of collected data 506. The cloud service 104 received tagged data (e.g., the crowdsourced packet 316) from a computing device such as the mobile computing device 304. An input validator 502 or other component of the cloud service 104 performs validation on the data tag 206 associated with the received crowdsourced packet 316. In some embodiments, the input validator 502 accesses the tag store 504 to determine whether the data tag 206 is valid. If the data tag 206 fails validation, the cloud service 104 discards the crowdsourced packet 316. If the data tag 206 passes validation, the input validator 502 stores the collected data 506 within the received crowdsourced packet 316. The collected data 506 may be stored in any memory area associated with and/or accessible by the cloud service 104.

The input validator 502 may also perform authentication to confirm the identity of the mobile computing device 304 submitting the crowdsourced packet 316. If the mobile computing device 304 used encryption to protect the crowdsourced packet 316 from tampering, the input validator 502 performs decrypts the received crowdsourced packet 316.

In the example of FIG. 5, the cloud service 104 also includes the tag generator 508 (e.g., a data tag authority). The tag generator 508 represents any component trusted by the cloud service 104 to issue new data tags 206, and may be located remotely from, or not affiliated with, the cloud service 104. The tag generator 508 issues new data tags 206 in various circumstances, and invalidates data tags 206 in other circumstances as described herein. For example, the tag generator 508 may issue a set of new data tags 206 to the mobile computing device 304 upon subscription or enrollment of the mobile computing device 304 to the cloud service 104, to a web site, or to another entity or program. The tag generator 508 may also issue new data tags 206 to the mobile computing device 304 based on time or activity of the mobile computing device 304. For example, the tag generator 508 may issue or allot a set of new data tags 206 every month or upon another interval. The tag generator 508 may also issue one or more new data tags 206 based on the activity or performance (e.g., as a reward) of the mobile computing device 304. For example, the tag generator 508 may issue a new data tag 206 for the mobile computing device 304 upon receipt of a valid or verified crowdsourced packet 316. At least because the rate of issuance of new data tags 206 is controlled by the cloud service 104, a malicious mobile computing device (or any probe device 102) cannot generate an excessive amount of manipulated data, even if the identity of the mobile computing device has been spoofed. Further, the port and internet protocol (IP) address of the mobile computing device 304 may also be monitored.

Figure 6:
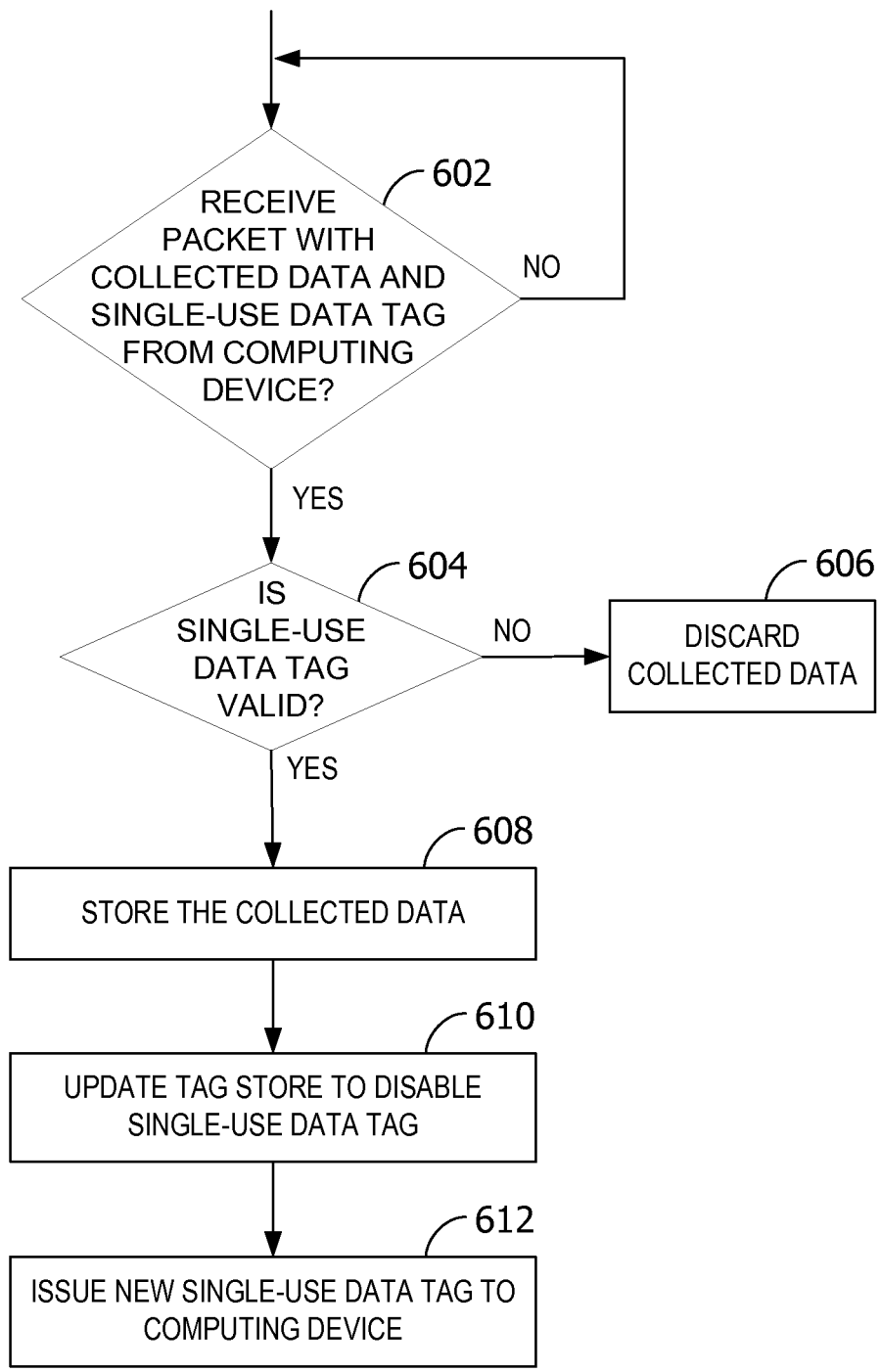
FIG. 6 is an exemplary flow chart illustrating operation of the cloud service to validate received data packets and issue new single-use data tags.

Referring next to FIG. 6, an exemplary flow chart illustrates operation of the cloud service 104 to validate received packets 316 and issue new single-use data tags 206. At 602, the cloud service 104 checks whether a packet 316 with the collected data and a data tag 206 has been received from a computing device such as the mobile computing device 304. If the packet 316 has been received, the cloud service 104 determines at 604 whether the data tag 206 associated with the received packet 316 is valid. The cloud service 104 may determine whether the data tag 206 is valid by searching for a matching copy of the data tag 206 in the tag store 504 or in a manifest of valid data tags 206 (e.g., using the cryptographic signature or key of the data tag 206), evaluating the expiration data 312 associated with the data tag 206, analyzing a quantity of data tags 206 received from the mobile computing device 304, or by other means.

For example, validating the data tag 206 may include determining a quantity of the data tags 206 previously received from the mobile computing device 304 and comparing the determined quantity to the threshold quantity previously assigned to the mobile computing device 304. The collected data is stored based on the comparison. For example, if the determined quantity of previously received data tags 206 is at or above the threshold quantity of issued data tags 206, the cloud service 104 deems the received packet 316 (or data tag 206) to be invalid. If the determined quantity of previously received data tags 206 is below the threshold quantity of issued data tags 206, the cloud service 104 deems the received packet 316 or data tag 206 to be valid.

In another example, the cloud service 104 defines a quantity or amount of the collected data available for association with each of the data tags 206 by the mobile computing device 304. The defined quantity may also be associated with the set of data tags 206 issued to the mobile computing device 304 as a whole, rather than associated with an individual data tag 206 within the set. In this example, validation of the received packet 316 includes calculating or determining the quantity or amount of collected data in the packet 316 and comparing the calculated quantity to the defined quantity available. If the mobile computing device 304 has previously submitted enough collected data to meet or exceed the defined quantity, or if the calculated quantity exceeds the defined quantity for one data tag 206, the cloud service 104 determines the received packet 316 to be invalid and discards some or all of the collected data. If the defined quantity has not yet been received from the mobile computing device 304, the cloud service 104 stores the collected data in the received packet 316 only up to the defined quantity.

If the data tag 206 is deemed to be invalid, the collected data is discarded at 606. The data tag 206 may be deemed invalid because the data tag 206 has expired, does not match a record of any data tag 206 issued by the cloud service 104 (e.g., determined by checking the tag store 504 or a manifest), or is otherwise determined to be fraudulent.

If the data tag 206 is determined to be valid, the cloud service 104 stores the collected data from the received packet 316 at 608. The cloud service 104 further updates the tag store 504 at 610 to indicate that the data tag 206 is no longer valid. For example, the cloud service 104 may disable the data tag 206, expire the data tag 206, remove the data tag 206, update a manifest, or otherwise invalidate the used data tag 206.

In some embodiments, the cloud service 104 maintains the tag store 504. The tag store 504 identifies the data tags 206 issued to each of the mobile computing devices 304. Each set of the issued data tags 206 represents a limited or defined quantity of the issued data tags 206. The cloud service 104 updates the tag store 504 to reflect use of a particular data tag 206 or issuance of a new data tag 206. For example, upon receipt of a valid packet 316 (e.g., the crowdsourced packet 316 deemed to have a valid data tag 206 associated therewith) from the mobile computing device 304, the cloud service 104 may issue at 612 a new data tag 206 from the tag store 504 to the mobile computing device 304 that submitted the valid packet 316. In other embodiments, the mobile computing device 304 may request additional data tags 206.

In some embodiments, the received packet 316 further includes a token used to detect whether tampering has occurred to the packet 316 during transmission from the mobile computing device 304 to the cloud service 104. The token may include any means for detecting pampering such as a checksum or cyclic redundancy check (CRC). The cloud service 104 uses the token, whose function is different from the function of the data tag 206, to determine whether tampering has occurred. If tampering has occurred, the received packet 316 may be discarded.

Figure 7:
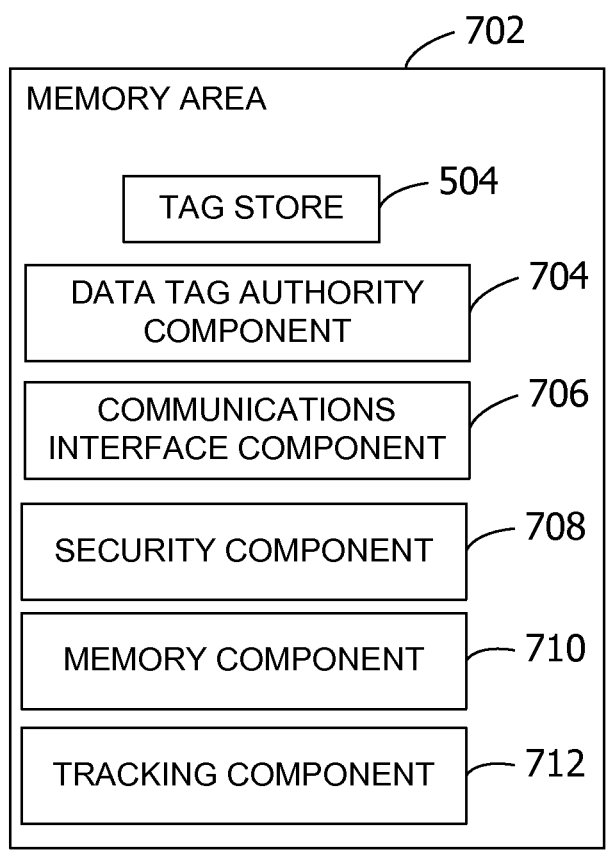
FIG. 7 is an exemplary block diagram illustrating a memory area of the cloud service storing computer-executable components for performing operations associated with the cloud service.

Referring next to FIG. 7, an exemplary block diagram illustrates a memory area 702 of the cloud service 104 storing computer-executable components for performing operations associated with the cloud service 104. The memory area 702 represents any memory, computer-readable media, or other means for storing data. The memory area 702 includes any quantity of media associated with or accessible by the cloud service 104.

In the example of FIG. 7, the memory area 702 includes the tag store 504. The tag store 504 represents a collection of "used" and "unused" data tags 206 available for delivery, assignment, or the like to the probe devices 102 (e.g., the mobile computing devices 304). The memory area 702 further stores one or more computer-executable components. Exemplary components include a data tag authority component 704, a communications interface component 706, a security component 708, a memory component 710, and a tracking component 712.

The data tag authority component 704, when executed by at least one processor of the cloud service 104, causes the cloud service 104 to issue a threshold quantity of single-use data tags 206 to a computing device such as the mobile computing device 304 or other probe device 102. In some embodiments the data tag authority component 704 further stores a copy of the issued single-use data tags 206 in the tag store 504. In other embodiments, the data tag authority component 704 maintains a record of the issued data tag 206 without storing a copy of the issued data tags 206.

The data tags 206 issued to the computing device by the data tag authority may be associated with the cloud service 104 in general, or may be associated with a particular entity such as a web service or web site. The data tag authority may further issue the computing device a set of data tags 206 associated with another web service or web site.

The communications interface component 706, when executed by at least one processor of the cloud service 104, causes the cloud service 104 to receive, from the computing device, the crowdsourced packet 316 having collected data and one of the issued single-use data tags 206. In some embodiments, the communications interface component 706 includes a network interface card and/or computer-executable instructions (e.g., a driver) for operating the network interface card.

The security component 708, when executed by at least one processor of the cloud service 104, causes the cloud service 104 to validate the data tag 206 received by the communications interface component 706 by searching for the data tag 206 in the tag store 504 or evaluating the expiration data 312 associated with the data tag 206. However, other forms of validation are contemplated. For example, the security component 708 may validate the data tag 206 by performing a calculation on information in, or derived from, the data tag 206.

The memory component 710, when executed by at least one processor of the cloud service 104, causes the cloud service 104 to store the collected data based on the validation performed by the security component 708. For example, if the data tag 206 fails validation, the security component 708 identifies the data tag 206 as invalid (and possibly malicious) after the data tag 206 fails validation. In this example, the cloud service 104 (e.g., the memory component 710) discards the collected data in the received packet 316. If the data tag 206 passes validation, the collected data is stored. After the data tag 206 passes validation or the collected data is stored, the data tag authority component 704 updates the tag store 504 to prevent re-use of the single-use data tag 206 received by the communications interface component 706. For example, updating the tag store 504 may include removing the used data tag 206 from the tag store 504, updating a manifest of valid data tags 206, marking the data tag 206 as used, or otherwise preventing the data tag 206 from being used to store collected data again. In some embodiments, the data tag authority component 704 may further issue another single-use data tag 206 for the computing device to replace the data tag 206 that was used.

In some embodiments, the cloud service 104 may want to identify collected data items that were stored upon validation of a particular data tag 206. For example, the cloud service 104 may become aware of fraud or malicious use of the data tag 206. The cloud service 104 executes the tracking component 712 to identify a plurality of previously-received packets 316 associated with the data tag 206 (e.g., by searching a log or other means for recording received packets 316). The memory component 710 may execute with the tracking component 712 to remove from storage the data items received in the identified plurality of previously-received packets 316.

The cloud service 104 may also identify other data tags 206 issued in the same batch or to the same particular computing device associated with the malicious action. In this example, the tracking component 712 may also execute to identify previously-received packets 316 associated with these other data tags 206. The memory component 710 may execute with the tracking component 712 to remove from storage the data items received in the identified previously-received packets 316.

Additional Examples

In some embodiments, the collected data from the computing devices includes confidential information. For example, the probe devices 102 represent computing devices associated with a medical practice. In this example, the collected data includes patient data such as medical records or other information covered by the Health Insurance Portability and Accountability Act (HIPAA) privacy rules. Using the data tags 206, the confidential information remains confidential while collection, storage, and tracking of the received information are enabled as described herein.

In another embodiment, the collected data includes one or more search query terms. The collected data may also include voting data such as votes cast in an election.

In an example scenario, the probe devices 102 may trade or exchange data tags 206 (e.g., buy or sell). In this example, one probe device 102 "vouches" for the credibility of the other probe device 102 by providing valid data tags 206.

In another example, aspects of the disclosure operate to prevent users from artificially improving feedback scores. For example, a business owner may submit multiple high ratings for a web site of the business owner to increase the ranking of the web site by search engines. Using the data tags 206 of the disclosure, however, the quantity of ratings from the business owner is limited by the quantity of data tags 206 issued to the business owner by the search engines.

At least a portion of the functionality of the various elements in FIGS. 1, 2, 3, 5, and 7 may be performed by other elements in these figures, or an entity (e.g., processor, web service, server, application program, computing device, etc.) not shown in these figures.

In some embodiments, the operations illustrated in FIGS. 2, 4, 5, and 6 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 302 and computing devices. In such embodiments, notice is provided to the users 302 of the collection of the data (e.g., via a dialog box or preference setting) and users 302 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for restricting and anonymizing a limited amount of trusted crowdsourced sensor data 314 for submission to the cloud service 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for submitting a limited amount of trusted crowdsourced sensor data to cloud service, said system comprising:
    a memory associated with a mobile computing device, said memory storing no more than a threshold quantity of single-use data tags issued by a data tag authority, said single-use data tags having expiration data associated therewith;
    one or more sensors; and
    a processor programmed to:
    obtain sensor data from at least one of the sensors;
    identify one of the threshold quantity of single-use data tags from the memory based on the expiration data;
    associate the obtained sensor data with the identified single-use data tag to create a trusted crowdsourced packet;
    send the trusted crowdsourced packet to a cloud service for storage;
    after sending the trusted crowdsourced packet to the cloud service for storage, alter the identified single-use data tag in the memory, to prevent re-use of the identified single-use data tag, by altering the expiration data to indicate that the identified single-use data tag has expired.

2. The system of claim 1, wherein the processor is programmed to identify one of the threshold quantity of single-use data tags from the memory based on the expiration data by selecting one of the single-use data tags that is unexpired.

3. The system of claim 1, wherein the processor is further programmed to receive the threshold quantity of single-use data tags from one or more of the following: the data tag authority, a web service, and a peer device.

4. The system of claim 1, wherein the sensor data comprises one or more of the following: a positioned observation including one or more beacons observed by the mobile computing device, voting data, patient data including medical records, and search query terms.

5. The system of claim 1, further comprising means for restricting and anonymizing a limited amount of trusted crowdsourced sensor data for submission to the cloud service.

6. The system of claim 1, wherein the processor is programmed to include a token in the trusted crowdsourced packet for validation by the cloud service.

7. A method comprising:
    receiving, by a cloud service from a computing device, a packet having collected data and a single-use data tag associated therewith, said single-use data tag being one of a threshold quantity of single-use data tags issued to the computing device;
    validating the single-use data tag in the received packet by searching for the single-use data tag in a tag store maintained by the cloud service and by evaluating expiration data of the single-use data tag;
    storing the collected data based on said validating; and
    updating the tag store to prevent re-use of the single-use data tag by changing an expiration date of the data tag to a current date.

8. The method of claim 7, further comprising maintaining the tag store having sets of the single-use data tags stored therein, each of the sets representing a limited quantity of the single-use data tags issued to one of a plurality of computing devices.

9. The method of claim 7, wherein the received packet further includes a token, and further comprising validating the packet using the token to detect tampering.

10. The method of claim 7, further comprising issuing another single-use data tag to the computing device after said updating.

11. The method of claim 7, wherein storing the collected data based on said validating comprises storing the collected data if the single-use data tag passes validation and discarding the collected data if the single-use data tag fails validation.

12. The method of claim 7, wherein the collected data associated with the single-use data tag is stored only once by the cloud service.

13. The method of claim 7, wherein validating the single-use data tag comprises:
   determining a quantity of single-use data tags received from the computing device;
   comparing the determined quantity to the threshold quantity; and
   storing the collected data based on said comparing.

14. The method of claim 7, wherein receiving the packet having collected data is not stored by the cloud service after expiry of the single-use data tag.

15. The method of claim 7, wherein validating the single-use data tag comprise matching the single-use data tag with a copy stored in the tag store at a time of issuance of the single-use data tag.

16. The method of claim 7, wherein validating the single-use data tag comprise determining a quantity of the collected data to be stored and storing only the determined quantity.

17. Computer storage memory embodying computer-executable components, said components comprising:
   a data tag authority component that when executed causes at least one processor to issue a threshold quantity of single-use data tags to a computing device, said data tag authority component further storing a copy of the issued single-use data tags in a tag store;
   a communications interface component that when executed causes at least one processor to receive, from a computing device, a packet having collected data and one of the issued single-use data tags;
   a security component that when executed causes at least one processor to validate the single-use data tag received by the communications interface component by searching for the single-use data tag in the tag store;
   a memory component that when executed causes at least one processor to store the collected data based on the validation performed by the security component, wherein the data tag authority component updates the tag store to prevent reuse of the single-use data tag received by the communications interface component by updating expiration data of the single-use data tag; and
   a tracking component for identifying a plurality of previously-received packets associated with one of the threshold quantity of single-use data tags, and wherein the memory component further removes the identified plurality of previously-received packets from the tag store.

18. The computer storage memory of claim 17, wherein the data tag authority component further issues another single-use data tag for the computing device.

19. The computer storage memory of claim 17, wherein the security component identifies the single-use data tag as malicious after the single-use data tag fails validation.

20. The computer storage memory of claim 17, wherein the threshold quantity of single-use data tags are associated with a web service, said data tag authority further issuing, to the computing device, another threshold quantity of single-use data tag associated with another web service.

* * * * *